(12) United States Patent  (10) Patent No.: US 8,453,338 B2
Ferrari  (45) Date of Patent: *Jun. 4, 2013

(54) COORDINATE MEASURING MACHINE WITH ROTATABLE GRIP

(75) Inventor: Paul Ferrari, Carlsbad, CA (US)

(73) Assignee: Hexagon Metrology, Inc., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/473,385

(22) Filed: May 16, 2012

(65) Prior Publication Data

US 2012/0291297 A1 Nov. 22, 2012

Related U.S. Application Data

(63) Continuation of application No. 13/190,335, filed on Jul. 25, 2011, now Pat. No. 8,201,341, which is a continuation of application No. 12/840,939, filed on Jul. 21, 2010, now Pat. No. 7,984,558, which is a continuation of application No. 12/057,966, filed on Mar. 28, 2008, now Pat. No. 7,779,548.

(51) Int. Cl.
*G01B 5/004* (2006.01)
*G01B 5/008* (2006.01)

(52) U.S. Cl.
USPC .......................................................... 33/503

(58) Field of Classification Search
USPC .......................................................... 33/503
See application file for complete search history.

(56) References Cited

U.S. PATENT DOCUMENTS

| | | | |
|---|---|---|---|
| 4,492,036 A | 1/1985 | Beckwith | |
| 4,972,090 A | 11/1990 | Eaton | |
| 5,084,981 A | 2/1992 | McMurtry et al. | |
| 5,088,337 A | 2/1992 | Bennett | |
| 5,148,377 A | 9/1992 | McDonald | |
| 5,187,874 A | 2/1993 | Takahashi et al. | |
| 5,189,797 A | 3/1993 | Granger | |

(Continued)

FOREIGN PATENT DOCUMENTS

| | | |
|---|---|---|
| DE | 4345091 | 7/1995 |
| DE | 10112977 | 11/2002 |

(Continued)

OTHER PUBLICATIONS

Redacted Response to Cass re U.S. Patent No. 7779548 (Date Unknown).

(Continued)

*Primary Examiner* — Christopher Fulton
(74) *Attorney, Agent, or Firm* — Knobbe, Martens, Olson & Bear, LLP.

(57) ABSTRACT

A portable coordinate measuring machine (PCMM) can have one or more rotatable grip assemblies to provide a location for an operator to grasp the PCMM. A rotatable grip assembly can include a rotatable sleeve, a grip portion disposed over the sleeve, and one or more retaining rings to prevent the rotatable grip from axially sliding along one or more members of an articulated arm PCMM. A PCMM can include two rotatable grips to allow an operator to grasp the PCMM with both hands for positioning and repositioning operations. One rotatable grip can be positioned on an arm member most distant the PCMM base, and another rotatable grip can be positioned on a housing at least partially encasing an articulating joint assembly coupled to the arm member most distant the PCMM base. Other numbers of and locations of rotatable grip assemblies can be used in PCMMs.

19 Claims, 7 Drawing Sheets

U.S. PATENT DOCUMENTS

| | | | |
|---|---|---|---|
| 5,251,156 A | 10/1993 | Heier et al. |
| 5,396,712 A | 3/1995 | Herzog |
| 5,408,754 A | 4/1995 | Raab |
| 5,412,880 A | 5/1995 | Raab |
| 5,505,003 A | 4/1996 | Evans et al. |
| 5,510,977 A | 4/1996 | Raab |
| 5,521,847 A | 5/1996 | Ostrowski et al. |
| 5,526,576 A | 6/1996 | Fuchs et al. |
| 5,528,505 A | 6/1996 | Granger et al. |
| 5,611,147 A | 3/1997 | Raab |
| 5,615,489 A | 4/1997 | Breyer et al. |
| 5,757,499 A | 5/1998 | Eaton |
| 5,768,792 A | 6/1998 | Raab |
| 5,794,356 A | 8/1998 | Raab |
| 5,822,450 A | 10/1998 | Arakawa et al. |
| 5,829,148 A | 11/1998 | Eaton |
| 5,978,748 A | 11/1999 | Raab |
| 5,991,704 A | 11/1999 | Rekar et al. |
| 6,134,506 A | 10/2000 | Rosenberg et al. |
| 6,151,789 A | 11/2000 | Raab |
| 6,161,079 A | 12/2000 | Zink et al. |
| 6,166,811 A | 12/2000 | Long et al. |
| 6,219,928 B1 | 4/2001 | Raab et al. |
| 6,366,831 B1 | 4/2002 | Raab |
| 6,430,828 B1 | 8/2002 | Ulbrich |
| 6,487,896 B1 | 12/2002 | Dall'Aglio |
| 6,526,670 B1 | 3/2003 | Carli |
| 6,598,306 B2 | 7/2003 | Eaton |
| 6,611,346 B2 | 8/2003 | Granger |
| 6,611,617 B1 | 8/2003 | Crampton |
| 6,618,496 B1 | 9/2003 | Tassakos et al. |
| 6,668,466 B1 | 12/2003 | Bieg et al. |
| 6,759,648 B2 | 7/2004 | Baxter et al. |
| 6,817,108 B2 | 11/2004 | Eaton |
| 6,892,465 B2 | 5/2005 | Raab et al. |
| 6,904,691 B2 | 6/2005 | Raab et al. |
| 6,925,722 B2 | 8/2005 | Raab et al. |
| 6,931,745 B2 | 8/2005 | Granger |
| 6,952,882 B2 | 10/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,051,450 B2 | 5/2006 | Raab et al. |
| 7,073,271 B2 | 7/2006 | Raab et al. |
| 7,096,077 B2 | 8/2006 | Price et al. |
| 7,152,456 B2 | 12/2006 | Eaton |
| 7,174,651 B2 | 2/2007 | Raab et al. |
| 7,246,030 B2 | 7/2007 | Raab et al. |
| 7,269,910 B2 | 9/2007 | Raab et al. |
| 7,296,364 B2 | 11/2007 | Seitz et al. |
| 7,296,979 B2 | 11/2007 | Raab et al. |
| 7,313,264 B2 | 12/2007 | Crampton |
| 7,372,581 B2 | 5/2008 | Raab et al. |
| 7,395,606 B2 | 7/2008 | Crampton |
| 7,441,341 B2 | 10/2008 | Eaton |
| 7,525,276 B2 | 4/2009 | Eaton |
| 7,546,689 B2 | 6/2009 | Ferrari et al. |
| 7,568,293 B2 | 8/2009 | Ferrari |
| 7,578,069 B2 | 8/2009 | Eaton |
| D599,226 S | 9/2009 | Gerent et al. |
| 7,624,510 B2 | 12/2009 | Ferrari |
| 7,640,674 B2 | 1/2010 | Ferrari et al. |
| 7,676,945 B2 | 3/2010 | Prestidge et al. |
| 7,693,325 B2 | 4/2010 | Pulla et al. |
| 7,743,524 B2 | 6/2010 | Eaton et al. |
| 7,774,949 B2 | 8/2010 | Ferrari |
| 7,779,548 B2 | 8/2010 | Ferrari |
| 7,784,194 B2 | 8/2010 | Raab et al. |
| 7,805,854 B2 | 10/2010 | Eaton |
| 7,908,757 B2 | 3/2011 | Ferrari |
| 7,984,558 B2 | 7/2011 | Ferrari |
| D643,319 S | 8/2011 | Ferrari et al. |
| 8,001,697 B2 | 8/2011 | Danielson et al. |
| 8,015,721 B2 | 9/2011 | Eaton et al. |
| 8,099,877 B2 | 1/2012 | Champ |
| 8,104,189 B2 | 1/2012 | Tait |
| 8,112,896 B2 | 2/2012 | Ferrari et al. |
| 8,122,610 B2 | 2/2012 | Tait et al. |
| 8,145,446 B2 | 3/2012 | Atwell et al. |
| 8,151,477 B2 | 4/2012 | Tait |
| 8,176,646 B2 | 5/2012 | Ferrari |
| 8,201,341 B2 | 6/2012 | Ferrari |
| 2008/0016711 A1 | 1/2008 | Baebler |
| 2011/0112786 A1 | 5/2011 | Desforges et al. |
| 2011/0175745 A1 | 7/2011 | Atwell et al. |
| 2011/0213247 A1 | 9/2011 | Shammas |

FOREIGN PATENT DOCUMENTS

| | | |
|---|---|---|
| EP | 0522610 | 1/1993 |
| FR | 2740546 | 4/1997 |
| GB | 2274526 | 7/1994 |
| JP | 04/032393 | 2/1992 |
| JP | 404057690 | 2/1992 |
| JP | 05/031685 | 2/1993 |
| JP | 2003/021133 | 1/2003 |
| JP | 2003/175484 | 6/2003 |
| JP | 2003/275484 | 9/2003 |
| JP | 2006/214559 | 8/2006 |
| WO | WO 98/08050 | 2/1998 |
| WO | WO 2008/080142 | 7/2008 |

OTHER PUBLICATIONS

Redacted Whidden Letter re Inter Partes Reexam of U.S. Patent No. 7779548 (Date Unknown).

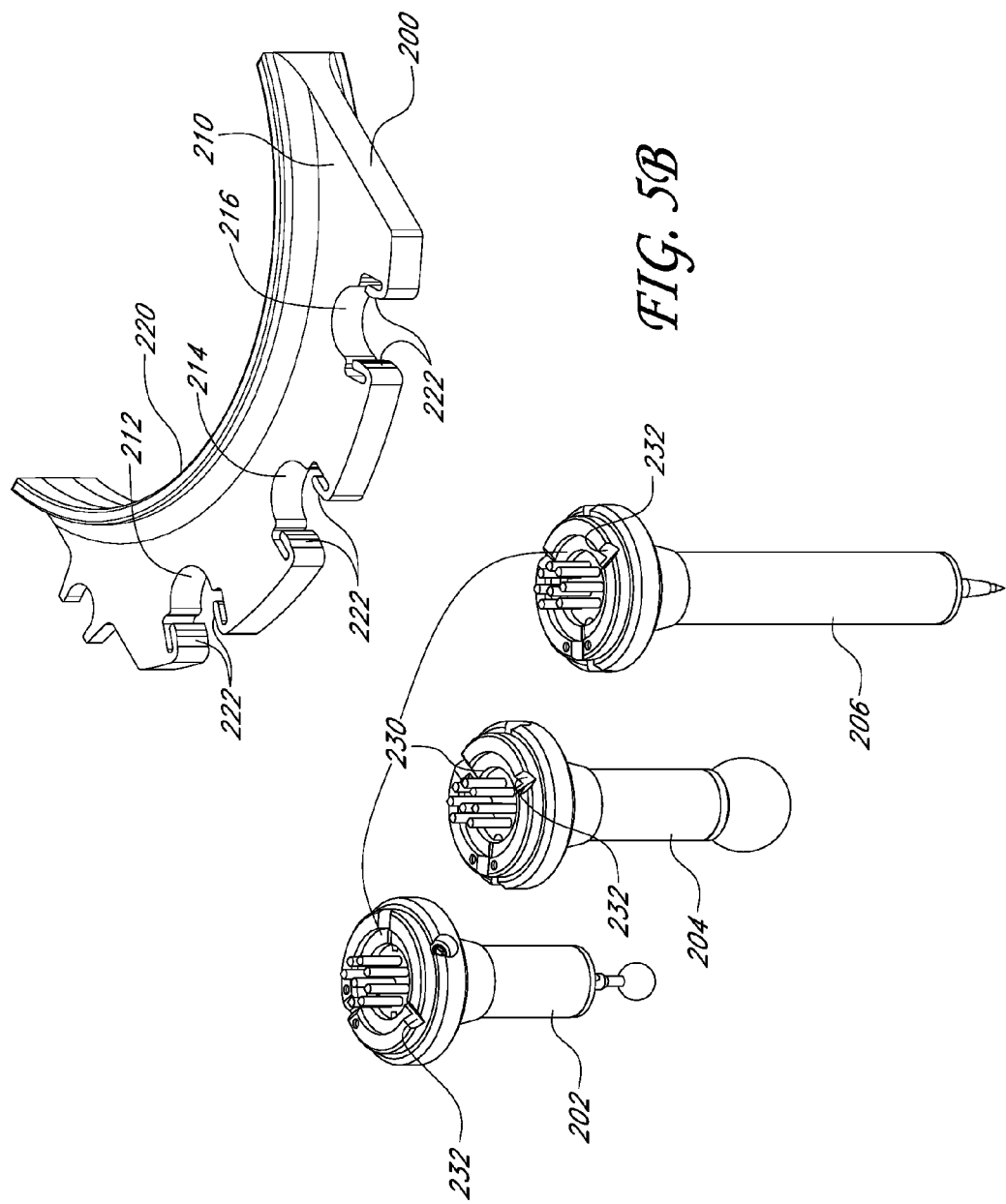

COORDINATE MEASURING MACHINE WITH ROTATABLE GRIP

CROSS-REFERENCE TO RELATED APPLICATIONS

This application is a continuation of U.S. patent application Ser. No. 13/190,335, filed on 25 Jul. 2011, now issued as U.S. Pat. No. 8,201,341, which is a continuation of U.S. patent application Ser. No. 12/840,939, filed on 21 Jul. 2010, now issued as U.S. Pat. No. 7,984,558, which is a continuation of U.S. patent application Ser. No. 12/057,966, filed on 28 Mar. 2008, now issued as U.S. Pat. No. 7,779,548, and entitled "COORDINATE MEASURING MACHINE WITH ROTATABLE GRIP," and the entirety of said applications are hereby incorporated by reference in their entireties.

BACKGROUND OF THE INVENTION

1. Field of the Invention

The present application relates to measurement devices, and more particularly, to articulated arm coordinate measuring.

2. Description of the Related Art

Rectilinear measuring systems, also referred to as coordinate measuring machines (PCMM's) and articulated arm measuring machines, are used to generate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measuring sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by an operator to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148 and 7,174,651.

Typically, when PCMMs are used, an operator positions his hands at various locations along the arms and joints of the PCMM to move the probe into a desired position for data acquisition. During the course of a measurement session, an operator may move his hands significantly to position and reposition the PCMM. Additionally, different operators may position their hands at different locations along the PCMM. Accordingly, it can be difficult to initially calibrate a PCMM to account for the various loads applied by different operators at different locations along the PCMM.

As mentioned above, the purpose of PCMM's is to take highly accurate measurements. Accordingly, there is a continuing need to improve the accuracy of such devices.

SUMMARY OF THE INVENTION

In some embodiments, a coordinate measuring machine is provided that comprises a first transfer member, a second transfer member, an articulating joint assembly, and a rotatable grip assembly. The articulating joint assembly rotatably couples the first transfer member to the second transfer member. The rotatable grip assembly is disposed on an outer surface of one of the first transfer member and the second transfer member.

In other embodiments, a coordinate measuring machine is provided that comprises a base, a first transfer member, a second transfer member, a first articulation joint assembly, a third transfer member, a second articulation joint assembly, and a rotatable grip assembly. The first transfer member is coupled to the base. The second transfer member is rotatably coupled to the first transfer member by the first articulation joint assembly. The third transfer member is rotatably coupled to the second transfer member by the second articulation joint assembly. The rotatable grip assembly is disposed on the third transfer member.

In other embodiments, a coordinate measuring machine is provided that comprises a base, a first transfer member, a first articulation member, a second transfer member, a second articulation member, a third articulation member, a first housing, a second housing, a first rotatable grip assembly, and a second rotatable grip assembly. The first transfer member is coupled to the base. The second transfer member is rotatably coupled to the first transfer member by the first articulation member. The third transfer member is rotatably coupled to the second transfer member by the second articulation member. The first housing is disposed about at least a portion of the first articulation member. The second housing is disposed about at least a portion of the second articulation member. The first rotatable grip assembly is disposed on the third transfer member and rotatable about a longitudinal axis defined by the third transfer member. The second rotatable grip assembly is disposed on the second housing and rotatable about the longitudinal axis.

In some embodiments, a coordinate measuring machine comprises a first transfer member, a second transfer member, an articulating joint assembly, and a probe caddie. The articulating joint assembly rotatably couples the first transfer member to the second transfer member. The probe caddie is disposed on the coordinate measuring machine and is adapted to receive at least one probe.

BRIEF DESCRIPTION OF THE DRAWINGS

These and other features, aspects, and advantages of the present inventions will now be described in connection with various embodiments, in reference to the accompanying drawings. The illustrated embodiments, however are merely examples and are not intended to limit the inventions. The drawings include the following figures:

FIG. 5B illustrates the probe caddie of FIG. 5A with various probes removed.

DETAILED DESCRIPTION OF THE PREFERRED EMBODIMENT

Figure 1:
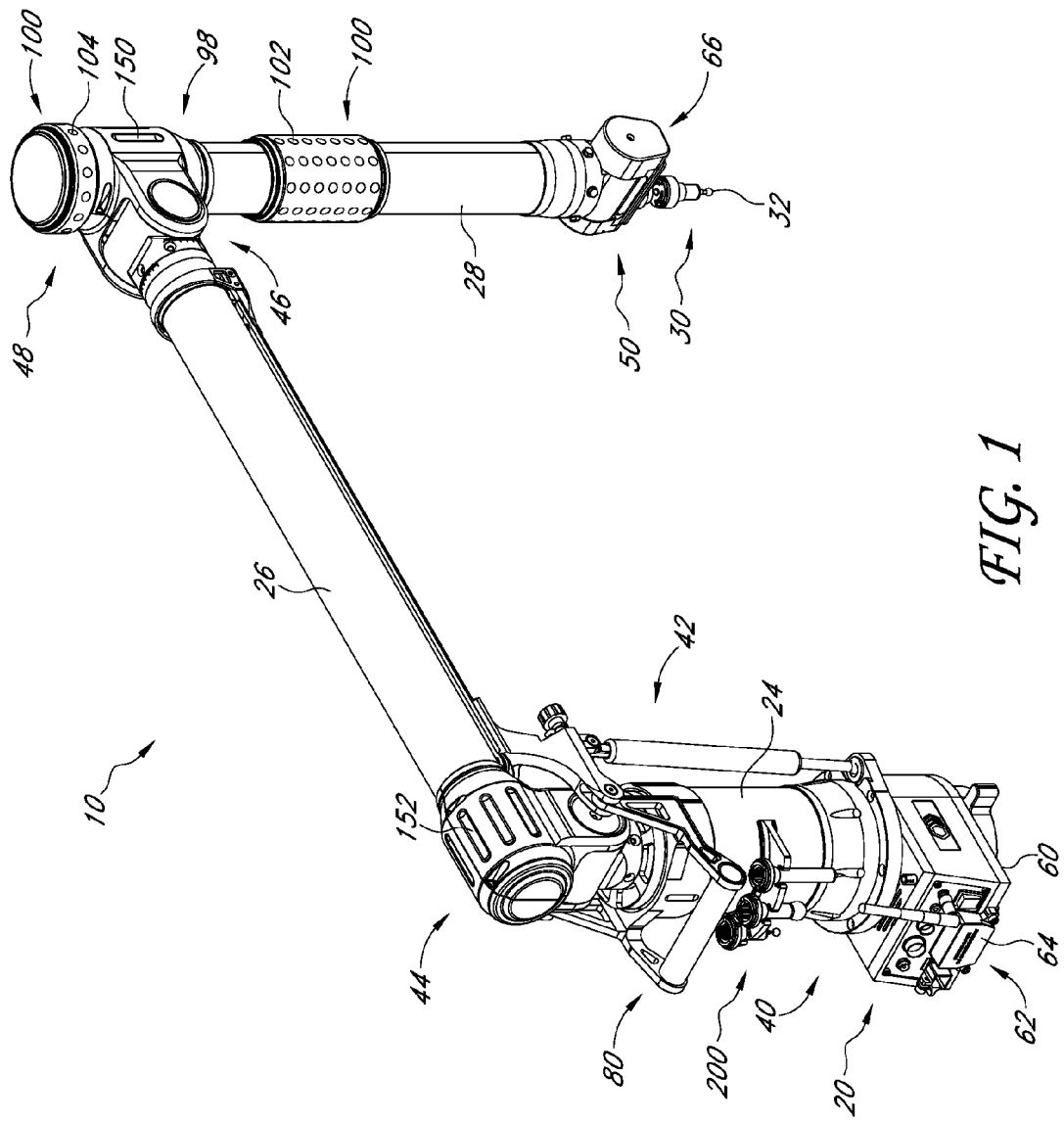
FIG. 1 illustrates a perspective view of one embodiment of a coordinate measuring machine

FIG. 1 illustrates one embodiment of a coordinate measuring machine (PCMM) 10. In the illustrated embodiment, the PCMM 10 comprises a base 20, a plurality of substantially rigid, transfer members 24, 26, and 28, a coordinate acquisition member 30, and a plurality of articulation members 40, 42, 44, 46, 48, 50 connecting the rigid transfer members 24, 26, 28 to one another. Each articulation member is configured to impart one or more rotational and/or angular degrees of freedom. The articulation members 40, 42, 44, 46, 48, and 50 allow the transfer members 24, 26, 28 of the PCMM 10 to be aligned in various spatial orientations thereby 38 allowing fine positioning of a coordinate acquisition member 30 in three-dimensional space.

The position of the rigid transfer members 24, 26, 28 and the coordinate acquisition member 30 may be adjusted manually, or using, robotic, semi-robotic, and/or any other adjustment method. In one embodiment, the PCMM 10, through the various articulation members 40, 42, 44, 46, 48, 50, is provided with six rotary axes of movement. However, there is no strict limitation to the number or order of axes of movement that may be used, and, in other embodiments, a PCMM can have more or fewer axes of movement.

In the embodiment of PCMM 10 illustrated in FIG. 1, the articulation members 40, 42, 44, 46, 48, 50 can be divided into two functional groupings based on their operation, namely: 1) those articulation members 40, 44, and 48 which allow the swiveling motion associated with a specific transfer member (hereinafter, "swiveling joints"), and 2) those articulation members 42, 46, and 50 which allow a change in the relative angle formed between two adjacent members or between the coordinate acquisition member 30 and its adjacent member (hereinafter, "hinge joints"). While the illustrated embodiment includes three swiveling joints and three hinge joints positioned as to create six axes of movement, it is contemplated that in other embodiments, the number of and location of hinge joints and swiveling joints can be varied to achieve different movement characteristics in a PCMM. For example, a substantially similar device with seven axes of movement could simply have an additional swivel joint between the coordinate acquisition member 30 and articulation member 50. In still other embodiments, the swiveling joints and hinge joints can be combined and/or used in different combinations.

The coordinate acquisition member 30 can comprise a contact sensitive member or hard probe 32 configured to engage surfaces of a selected object and/or generate coordinate data on the basis of probe contact as is known in the art. Alternatively, the coordinate acquisition member 30 can comprise a remote scanning and detection component that does not necessarily require direct contact with the selected object to acquire geometry data. In one embodiment, a laser coordinate detection device (e.g., laser camera) can be used to obtain geometry data without direct object contact. It will be appreciated that in various embodiments of PCMM, various coordinate acquisition member 30 configurations can be used including: a contact-sensitive probe, a remote-scanning probe, a laser-scanning probe, a probe that uses a strain gauge for contact detection, a probe that uses a pressure sensor for contact detection, a probe that used an infrared beam for positioning, and a probe configured to be electrostatically-responsive can be used for the purposes of coordinate acquisition.

With continued reference to FIG. 1, in various embodiments of the PCMM 10, the various devices which may be used for coordinate acquisition, such as the probe 32, may be configured to be manually disconnected and reconnected from the PCMM 10 such that an operator can change coordinate acquisition devices without specialized tools. Thus, an operator can quickly and easily remove one coordinate acquisition device and replace it with another coordinate acquisition device. Such a connection may comprise any quick disconnect or manual disconnect device. This rapid connection capability of a coordinate acquisition device can be particularly advantageous in a PCMM 10 that can be used for a wide variety of measuring techniques (e.g. measurements requiring physical contact of the coordinate acquisition member with a surface followed by measurements requiring only optical contact of the coordinate acquisition member) in a relatively short period of time.

In the embodiment of FIG. 1, the coordinate acquisition member 30 also comprises buttons 66, which are configured to be accessible by an operator. By pressing one or more of the buttons 66 singly, multiply, or in a preset sequence, the operator can input various commands to the PCMM 10. In some embodiments the buttons 66 can be used to indicate that a coordinate reading is ready to be recorded. In other embodiments the buttons 66 can be used to indicate that the location being measured is a home position and that other positions should be measured relative to the home position. In other embodiments the buttons may be used to turn on or off the PCMM 10. In other embodiments, the buttons 66 can be programmable to meet an operator's specific needs. The location of the buttons 66 on the coordinate acquisition member 30 can be advantageous in that an operator need not access the base 20 or a computer in order to activate various functions of the PCMM 10 while using the coordinate acquisition member 30. This positioning may be particularly advantageous in embodiments of PCMM having transfer members 24, 26, or 28 that are particularly long, thus placing the base 20 out of reach for an operator of the coordinate acquisition member 30. In some embodiments of the PCMM 10, any number of operator input buttons (e.g., more or fewer than the three illustrated in FIG. 1), can be provided, which may be placed in various other positions on the coordinate acquisition member 30 or anywhere on the PCMM 10. Other embodiments of PCMM can include other operator input devices positioned on the PCMM or the coordinate acquisition member 30, such as switches, rotary dials, or touch pads in place of, or in addition to operator input buttons.

With continued reference to FIG. 1, in some embodiments, the base 20 further comprises magnetic attachment mounts 60 that can attach the base 20 to a metallic work surface. The magnetic attachment mounts 60 can desirably be selectively engaged so that an operator can position the PCMM 10 on to a work surface then engage the magnetic attachment mounts 60 once the PCMM 10 has been placed in a desirable position. In other embodiment, the base 20 can be coupled to a work surface through a vacuum mount, bolts or other coupling devices. Additionally, in some embodiments, the base 20 can comprise various electrical interfaces such as plugs, sockets, or attachment ports 62. In some embodiments, attachment ports 62 can comprise connectability between the PCMM 10 and a USB interface for connection to a processor such as a general purpose computer, an AC power interface for connection with a power supply, or a video interface for connection to a monitor. In some embodiments, the PCMM 10 can be configured to have a wireless connection with an external processor or general purpose computer such as by a WiFi connection, Bluetooth connection, RF connection, infrared connection, or other wireless communications protocol. In some embodiments, the various electrical interfaces or attachment ports 62 can be specifically configured to meet the requirements of a specific PCMM 10.

With continued reference to FIG. 1, in some embodiments, the base 20 of the PCMM 10 can also include a self contained power source 64 such as a battery. Embodiments of PCMM 10 having a self contained power source can be easily moved to various locations that do not have easy access to a power source such as an AC power outlet, allowing enhanced flexibility in the operating environment of the PCMM 10. In one embodiment, the self-contained power source 64 can be a lithium-ion rechargeable battery that can provide power to the PCMM for periods of use away from a power outlet. In other embodiments, the self-contained power source 64 can be other types of rechargeable batteries such as nickel cadmium, nickel metal hydride, or lead acid batteries. In other embodiments, the self-contained power source 64 can be a single use battery such as an alkaline battery.

With continued reference to FIG. 1, the transfer members 24, 26, and 28 are preferably constructed of hollow generally cylindrical tubular members so as to provide substantial rigidity to the members 24, 26, and 28. The transfer members 24, 26, and 28 can be made of any suitable material which will provide a substantially rigid extension for the PCMM 10. As will be discussed in greater detail below, the transfer members 24, 26, and 28 preferably define a double tube assembly so as to provide additional rigidity to the transfer members 24, 26, and 28. Furthermore, it is contemplated that the transfer members 24, 26, and 28 in various other embodiments can be made of alternate shapes such as those comprising a triangular or octagonal cross-section.

In some embodiments, it can be desirable to use a composite material, such as a carbon fiber material, to construct at least a portion of the transfer members 24, 26, and 28. In some embodiments, other components of the PCMM 10 can also comprise composite materials such as carbon fiber materials. Constructing the transfer members 24, 26, 28 of composite such as carbon fiber can be particularly advantageous in that the carbon fiber can react less to thermal influences as compared to metallic materials such as steel or aluminum. Thus, coordinate measuring can be accurately and consistently performed at various temperatures. In other embodiments, the transfer members 24, 26, 28 can comprise metallic materials, or can comprise combinations of materials such as metallic materials, ceramics, thermoplastics, or composite materials. Also, as will be appreciated by one skilled in the art, many of the other components of the PCMM 10 can also be made of composites such as carbon fiber. Presently, as the manufacturing capabilities for composites are generally not as precise when compared to manufacturing capabilities for metals, generally the components of the PCMM 10 that require a greater degree of dimensional precision are generally made of a metals such as aluminum. It is foreseeable that as the manufacturing capabilities of composites improved that a greater number of components of the PCMM 10 can be also made of composites.

With continued reference to FIG. 1, some embodiments of the PCMM 10 may also comprise a counterbalance system 80 that can assist an operator by mitigating the effects of the weight of the transfer members 26 and 28 and the articulating members 44, 46, 48, and 50. In some orientations, when the transfer members 26 and 28 are extended away from the base 20, the weight of the transfer members 26 and 28 can create difficulties for an operator. Thus, a counterbalance system 80 can be particularly advantageous to reduce the amount of effort that an operator needs to position the PCMM for convenient measuring. In some embodiments, the counterbalance system 80 can comprise resistance units (not shown) which are configured to ease the motion of the transfer members 26 and 28 without the need for heavy weights to cantilever the transfer members 26 and 28. It will be appreciated by one skilled in the art that in other embodiments simple cantilevered counterweights can be used in place or in combination with resistance units.

In the embodiment illustrated in FIG. 1, the resistance units are attached to the transfer member 26 to provide assisting resistance for motion of the transfer members 26 and 28. In some embodiments, the resistance units can comprise hydraulic resistance units which use fluid resistance to provide assistance for motion of the transfer members 26 and 28. In other embodiments the resistance units may comprise other resistance devices such as pneumatic resistance devices, or linear or rotary spring systems.

With continued reference to FIG. 1, the position of the probe 32 in space at a given instant can be calculated if the length of each transfer member 24, 26, and 28 and the specific position of each of the articulation members 40, 42, 44, 46, 48, and 50 are known. The position of each of the articulation members 40, 42, 44, 46, 48, and 50 can be measured as a singular rotational degree of motion using a dedicated rotational transducer, which will be described in more detail below. Each transducer can output a signal (e.g., an electrical signal), which can vary according to the movement of the 40, 42, 44, 46, 48, 50 in its degree of motion. The signal can be carried through wires or otherwise transmitted to the base 20 of the PCMM 10. From there, the signal can be processed and/or transferred to a computer for determining the position of the probe 32 in space.

In some embodiments of PCMM 10, a rotational transducer for each of the articulation members 40, 42, 44, 46, 48., and 50 can comprise an optical encoder. Various embodiments of optical encoder are discussed in more detail below with reference to FIGS. 3-6. In general, an optical encoder measures the rotational position of an axle by coupling is movement to a pair of internal hubs having successive transparent and opaque bands. In such embodiments, light can be shined through or reflected from the hubs onto optical sensors which feed a pair of electrical outputs. As the axle sweeps through an arc, the output of an analog optical encoder can be substantially two sinusoidal signals which are 90 degrees out of phase. Coarse positioning can be determined through monitoring a change in polarity of the two signals. Fine positioning can be determined by measuring an actual value of the two signals at a specific time. In certain embodiments, enhanced accuracy can be obtained by measuring the output precisely before it is corrupted by electronic noise. Thus, digitizing the position information before it is sent to the processor or computer can lead to enhanced measurement accuracy.

As will be described in detail below, in the illustrated embodiment, the articulation members 40, 42, 44, 46, 48., and 50 can be divided into two general categories, namely: 1) articulation members 40, 44, 48, which allow swiveling motion of a transfer member 24, 26, 28 and are thus sometimes referred to as "swivel members" 40, 44, 48 herein and 2) articulation members 42, 46 and 50, which allow for change in the relative angle formed between two adjacent members and are sometimes referred to herein as "pivot or hinge members" 42, 46, 50.

While several embodiment and related features of a PCMM 10 have been generally discussed herein, additional details and embodiments of PCMM 10 can be found in U.S. Pat. Nos. 5,829,148 and 7,174,651, the entirety of these patents are hereby incorporated by reference herein. While certain features below are discussed with reference to the embodiments of PCMM 10 described above, it is contemplated that they can be applied in other embodiments of PCMM such as those described in U.S. Pat. Nos. 5,829,148 or 7,174,651, U.S. patent application Ser. No. 11/963,531, filed Dec. 21, 2007, entitled "IMPROVED JOINT AXIS FOR COORDINATE MEASUREMENT MACHINE", U.S. patent application Ser. No. 11/943,463, filed Nov. 20, 2007, entitled "COORDINATE MEASUREMENT DEVICE WITH IMPROVED JOINT" and U.S. patent application Ser. No. 11/775,081, filed Jul. 9, 2007, entitled "JOINT FOR COORDINATE MEASUREMENT DEVICE", the entire contents of these patents and patent applications being incorporated herein by reference.

Figure 2A:
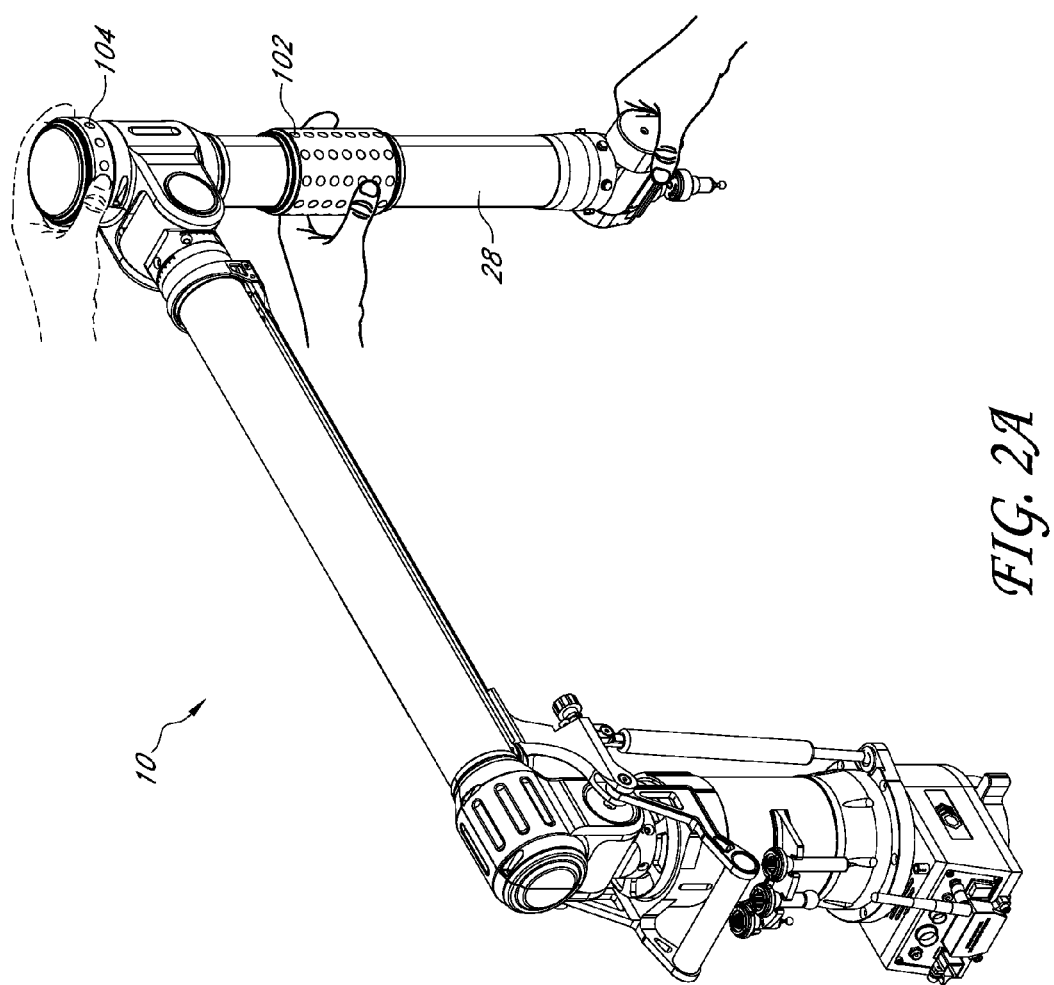
FIG. 2A illustrates a perspective view of the coordinate measuring machine of FIG. 1 in a first position with an operator's hands positioned on rotatable grips thereof
Figure 2B:
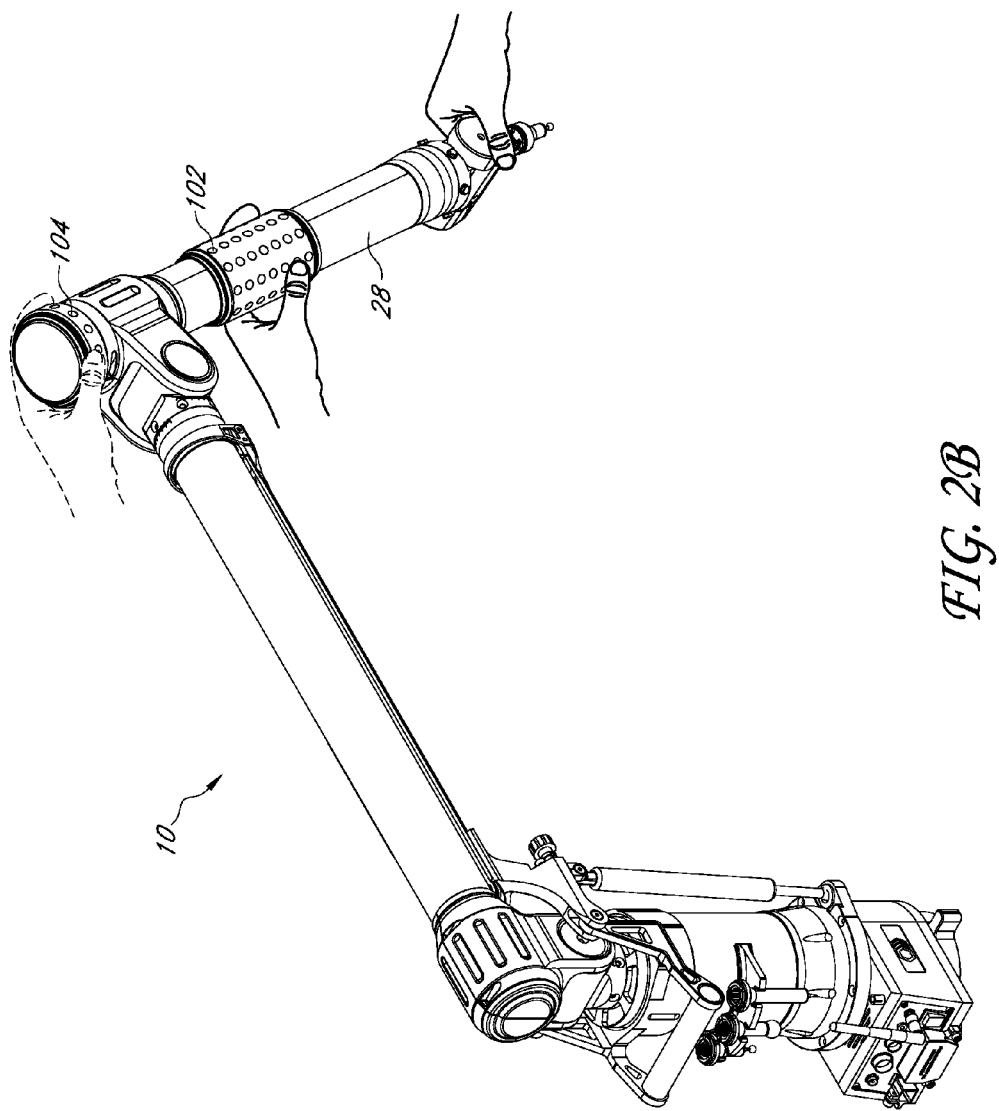
FIG. 2B illustrates a perspective view of the coordinate measuring machine of FIG. 1 in a second position with the operator's hands positioned on rotatable grips thereof

With reference to FIGS. 1, 2A, and 2B, in some embodiments, the PCMM 10 can comprise one or more rotatable grip assemblies 100. In the illustrated embodiment, the PCMM 10 can comprise a lower rotatable grip assembly 102 and an upper rotatable grip assembly 104. Advantageously, having a lower rotatable grip assembly 102 and an upper rotatable grip assembly 104 disposed on the transfer member 28, allows the operator to easily use both hands in positioning the PCMM 10. In other embodiments, the PCMM 10 can comprise one, or more than two rotatable grips.

Certain desirable characteristics of a manually operated articulated arm PCMM are that the PCMM is easy to articulate by an operator and accurate in its measurement. One advantage of a rotatable grip assembly 100 as described herein is that it can make the PCMM easier for an operator to articulate. The rotatable grip assembly 100 rolls through the operator's hands with the grip relieving the majority of the friction that would normally exist between the operator's hand and the transfer member of the PCMM.

Another advantage of the easy, ergonomic, and low friction operation of the rotatable grip assembly 100 is a more accurate PCMM. When an operator positions a hand on the transfer member of the PCMM, variability of fictional forces between the operator and the PCMM can be a source of error in the accuracy of a PCMM's measurement. When an operator's hand is not on a rotatable grip assembly 100, fictional forces between the operator's hand and the transfer member of the PCMM can change as the operator articulates the arm into different positions. Further these forces can vary as the operator stiffens or loosens his grip on the arm. These forces also vary from one operator to another.

Some previous PCMMs have had overdesigned joint assemblies to compensate for the variability in fictional forces and the variability and in positions in which an operator may grasp the PCMM. These joint assemblies resulted in a PCMM that was relatively heavy and costly. Other PCMMs have included costly strain sensors or additional encoder read heads in order to compensate for operator forces. Advantageously, a PCMM with one or more rotatable grip assemblies 100 can reduce operator forces on the PCMM in a cost-efficient manner.

Desirably, the rotatable grip assemblies 100 can rotate freely and infinitely about a portion of the PCMM 10. This free and infinite rotation allows an operator to easily grasp the rotatable grips 100 and position the PCMM 10 as desired. In other embodiments the rotatable grips 100 can rotate through a predetermined range defined by rotational stops.

With reference to FIGS. 2A and 2B, an operator may grasp the PCMM 10 using the grip assemblies 102, 104. As the operator moves the PCMM 10 from a first position (illustrated in FIG. 2A) to a second position (illustrated in FIG. 2B), the grip assemblies 102, 104 can rotate to accommodate this motion. Thus, advantageously, an operator need not reposition one or both of his hands as he repositions the PCMM 10.

Another advantage of the rotatable grips 100 is increased accuracy of the measurements obtained. Previously, operators would position their hands at any convenient location along the transfer member 28. Accordingly, the PCMM 10 could experience slightly different operator-induced load conditions depending on the position of the operator's hands. While the PCMM 10 can be calibrated to account for the position of an operator's hands at an expected location, previously, there would be no indication that an operator would place his hands at this expected location. However, the rotatable grips 100 provide prescribed locations upon which an operator is to position his hands. Thus, advantageously, the PCMM 10 can be calibrated with a known position of the operator's hands on the PCMM 10. Accordingly, variations in PCMM accuracy due to variations in positioning of individual operators' hands can be minimized.

Furthermore, the rotatable grips 100 can be positioned on the PCMM 10 at a location where relatively little force is required to position the PCMM 10. Accordingly, a PCMM 10 having rotatable grips 100 so positioned would have enhanced durability and reliability as it would likely encounter lower loading during routine use than a PCMM without rotatable grips 100.

With continued reference to FIGS. 1, 2A, and 2B, in the illustrated embodiment, the rotatable grip assemblies 100 can be disposed on the transfer member 28 furthest away from the base 20. Desirably, operators typically position the PCMM 10 using this transfer member 28. Operators typically position one hand adjacent the probe and another either along the transfer member 28 or at an end of the transfer member 28 opposite the probe, as illustrated in phantom lines in FIGS. 2A and 2B. In the illustrated embodiment, the PCMM 10 includes two rotatable grips assemblies 100, one at each typical operator grasping location. In other embodiments, rotatable grip assemblies 100 can be disposed on other transfer members 26, 24 in addition to or instead of the rotatable grips 102, 104 on transfer member 28 furthest away from the base 20.

Figure 3:
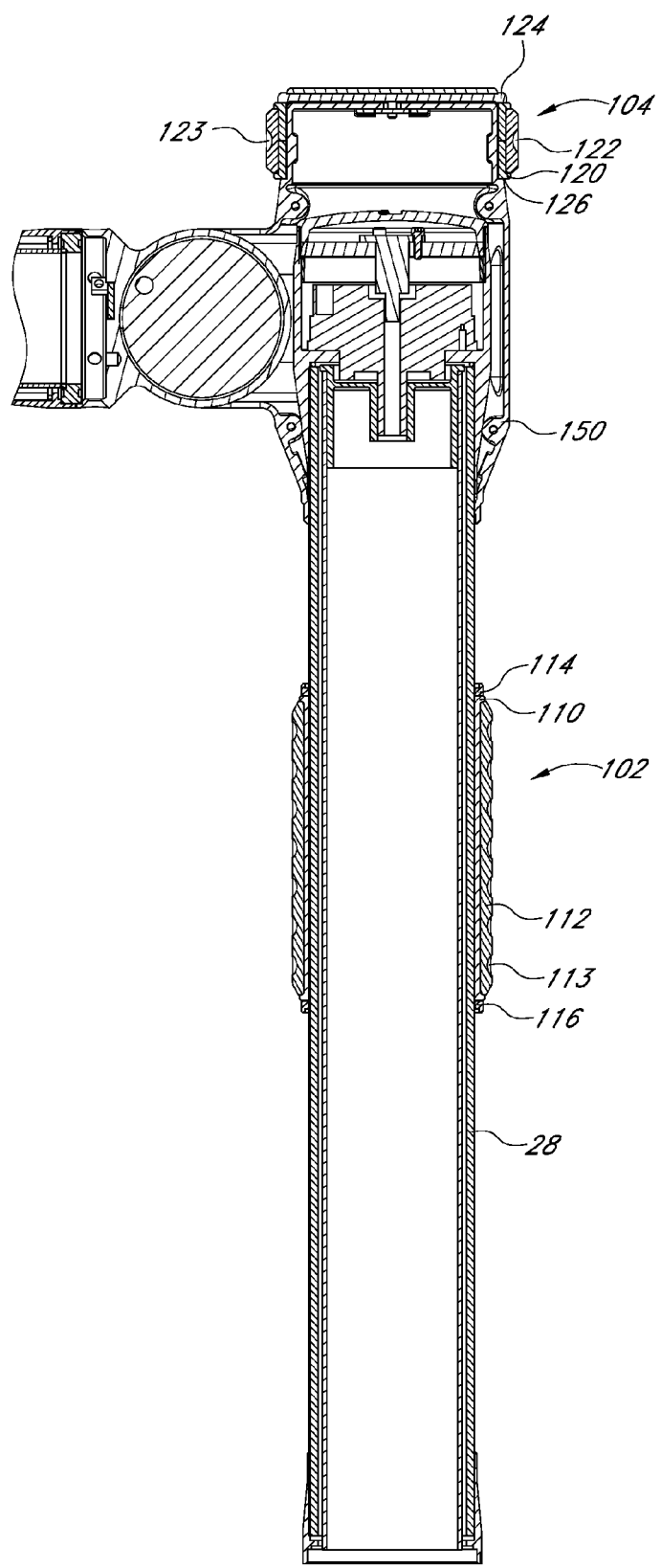
FIG. 3 illustrates a cutaway view of a transfer member of the coordinate measuring machine of FIG. 1.
Figure 4:
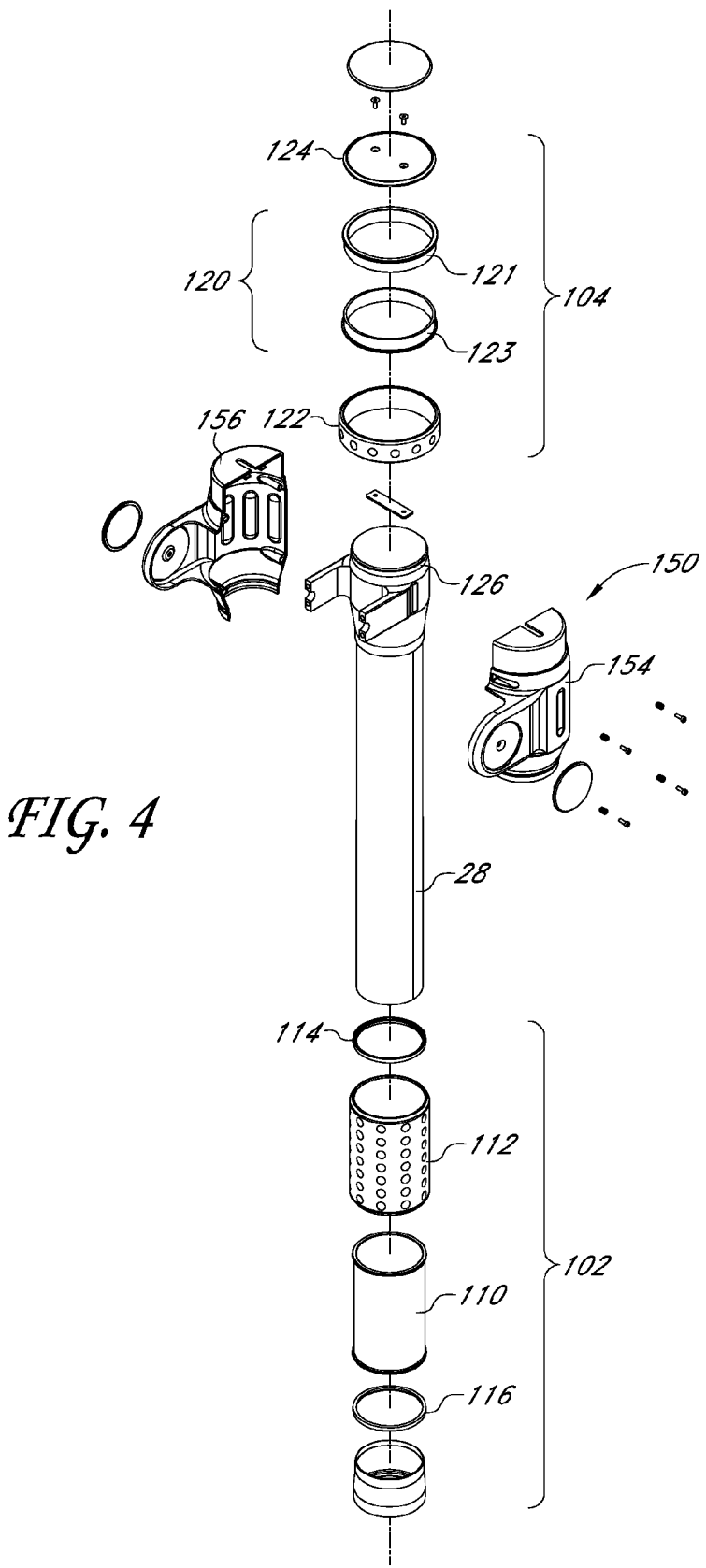
FIG. 4 illustrates an exploded perspective view of the transfer member of FIG. 3.

With reference to FIGS. 3 and 4, construction of the illustrated embodiment of upper and lower rotatable grip assemblies 102, 104 is further described. FIG. 3 illustrates the longitudinal cross-sectional view of transfer member 28 with rotatable grips 102, 104 likewise illustrated in cross-section. FIG. 4 illustrates an exploded assembly view of transfer member 28 including rotatable grips 102, 104.

With continued reference to FIGS. 3 and 4, lower rotatable grip 102 can comprise a rotatable sleeve 110 disposed over an outer surface of transfer member 28, a grip portion 112, an upper retaining ring 114, and a lower retaining ring 116. The rotatable sleeve 110 can be constructed of a material having a relatively low coefficient of friction. For example, the rotatable sleeve 110 can be constructed of a synthetic material such as can be found in a bushing, for example, a nylon or Delrin® material. Desirably, the rotatable sleeve 110 can rotate freely with respect to an outer surface of the transfer member 28 and surfaces of the upper retaining ring 114 and the lower retaining ring 116. The rotatable sleeve 110 can have a generally cylindrical body with flanged lips at a first end and a second end thereof. The flanged lips on the rotatable sleeve 110 can retain the grip portion 112.

With continued reference to FIGS. 3 and 4, the grip portion 112 can have a generally cylindrical shape and be sized to snugly fit over the rotatable sleeve 110. The grip portion 112 can comprise a relatively soft material such as a natural or synthetic rubber, or a silicone rubber for operator gripability and comfort. In the illustrated embodiment, the rotatable sleeve 110 and grip portion 112 are separately formed such that the rotatable sleeve 110 can allow for free rotation of the rotatable grip 102 and the grip portion 112 can provide enhanced operator gripability and comfort. In some embodiments, the grip portion 112 can be relatively elastic and can be stretch fit over the rotatable sleeve 110. In some embodiments, the grip portion 112 can be adhered to the rotatable sleeve 110 using an adhesive or epoxy. In other embodiments, the rotatable sleeve 110 in the grip portion 112 can be integrally formed of a material having satisfactory material properties with respect to friction and operator comfort.

With continued reference to FIGS. 3 and 4, to further enhance the gripability of the grip portion 112, in some embodiments, the grip portion 112 can include gripping features such as, for example, one or more dimples or indentations 113, one or more protrusions or ridges, or surface texturing. Advantageously, this enhanced gripability can reduce the likelihood an operator's hand will slip from the rotatable grip 102 while the operator is positioning the PCMM 10.

With continued reference to FIGS. 3 and 4, the upper and lower retaining rings 114, 116 can maintain an axial position of the lower rotatable grip 102 with respect to the transfer member 28. In some embodiments, the retaining rings 114, 116 can be constructed of a metallic material and can be sized to be press fit onto the transfer member 28 and to limit axial movement of the rings 114, 116 on the transfer member 28 once positioned. In other embodiments, the retaining rings can comprise nonmetallic materials such as plastics, composite materials, or other materials. Desirably, the retaining rings 114, 116 can be constructed of a material having material properties and a surface finish that allow the rotatable sleeve 110 to freely rotate between the retaining rings 114, 116. In some embodiments, the outer surface of the transfer member 28 can include at least one recess configured to receive at least one of the retaining rings 114, 116. In other embodiments, the rotatable grip assembly 100 does not include retaining rings 114, 116. Thus, the rotatable grip assembly could move axially thereby enhancing positioning ease for the operator.

With continued reference to FIGS. 3 and 4, the upper rotatable grip 104 is illustrated. The upper rotatable grip 104 can comprise a rotatable sleeve 120, a grip portion 122, and a retaining ring 124. The rotatable sleeve 120 can be disposed on a housing 150 positioned about an articulating joint coupled to the transfer member 28. In some embodiments, the housing 150 can comprise a two-piece housing including a first portion 154 and a second portion 156. In other embodiments, the housing 150 can include more or fewer than two pieces. In still other embodiments, the rotatable sleeve 120 can be configured to be disposed on an upper end of the transfer member 128 with no housing present.

In some embodiments, the rotatable sleeve 120 can comprise a first portion 121 and a second portion 123. Each of the first and second portions 121, 123 can include a generally cylindrical portion configured to underlie the grip portion 122 and a flanged lip configured to retain the grip portion 122. In the illustrated embodiment, this two-piece rotatable sleeve 120 can be easily installed on the housing 150 during manufacture of the PCMM 10. In other embodiments, the rotatable sleeve 120 can be formed as a single unitary component. The rotatable sleeve 120 can have generally cylindrical shape having flanged lips at first and second end thereof to retain a gripping portion 122. Desirably, the rotatable sleeve 120 can be constructed of material having a relatively low coefficient of friction such that it can freely rotate with respect to the housing 150 and the retaining ring 124. In some embodiments the rotatable sleeve 120 can be constructed of the same material as the rotatable sleeve 110 of the lower rotatable grip 102. In other embodiments, the rotatable sleeve 120 can be constructed of one of a variety of different materials having the desired properties.

With continued reference to FIGS. 3 and 4, and the grip portion 122 of the upper rotatable grip 104 can have a generally cylindrical shape and be sized to snugly fit over the rotatable sleeve 120. The grip portion 122 can comprise a relatively soft material such as natural or synthetic rubber, or a silicone rubber for operator gripability and comfort. In the illustrated embodiment, the rotatable sleeve 120 and a grip portion 122 are separately formed such that the rotatable sleeve 120 can allow for free rotation of the rotatable grip and the grip portion 122 can provide enhanced operator gripability and comfort. In some embodiments, the grip portion 122 can be relatively elastic can be stretch fit over the rotatable sleeve 120. In some embodiments, the grip portion 122 can be adhered to the rotatable sleeve 120 using an adhesive or epoxy. However, in other embodiments, the rotatable sleeve 120 and the grip portion 122 can be integrally formed from a material having satisfactory material properties with respect to friction and operator comfort.

With continued reference to FIGS. 3 and 4, to further enhance the gripability of the grip portion 122, in some embodiments, the grip portion 122 can include gripping features such as, for example, one or more dimples or indentations 123, one or more protrusions or ridges, or surface texturing. Advantageously, this enhanced gripability can reduce the likelihood an operator's hand will slip from the rotatable grip 104 when the operator is positioning the PCMM 10.

With continued reference to FIGS. 3 and 4, the retaining ring 124 can maintain an axial position of the upper rotatable grip with respect to the transfer member 28 and the housing 150. In some embodiments, the retaining ring 124 can be constructed of a metallic material and can be sized to be press fit onto the housing 150 and to limit axial movement of the ring 124 on the housing 150 once positioned. In other embodiments, the retaining ring 124 can comprise a nonmetallic material such as a plastic, composite material, or other material. Desirably, the retaining ring 124 can be constructed of a material having material properties and a surface finish that allow the rotatable sleeve 120 to freely rotate. In some embodiments, the housing 150 can comprise a recess 126 formed therein against which an end of the rotatable sleeve 120 can abut. Accordingly, in some embodiments the upper rotatable grip 104 comprises a single retaining ring 124 to restrict axial movement of the rotatable grip 104. In other embodiments, the upper rotatable grip 104 can comprise two retaining rings, positioned at opposite ends of the rotatable sleeve 120 to restrict axial movement thereof. In other embodiments, a recess formed in the housing 150 can restrict axial movement of the rotatable sleeve 120 at each end of the rotatable sleeve 120.

With respect to FIGS. 1-4, joint housings 150, 152 are illustrated which can at least partially encase portions of several of the articulation members 42, 44, 46, 48. As discussed above with respect to FIGS. 3 and 4, in some embodiments a joint housing 150 can comprise a two-piece housing including a first housing portion 154 in the second housing portion 156, and can include a rotatable joint 104 disposed thereon. In other embodiments, the joint housings 150, 152 can be unitarily formed, and in other embodiments, the joint housings 150, 152 can comprise more than two portions such as, for example, three portions or four portions.

Advantageously, the two-piece joint housings 150, 152 illustrated in the embodiments of FIGS. 1-4, can be relatively inexpensively manufactured and assembled. Also, desirably, the joint housings 150, 152 can provide a uniform aesthetic appearance to the PCMM 10. The joint housings 150, 152 can likewise protect the articulation members 42, 44, 46, 48 from impacts and exposure to dust or debris.

With reference to FIGS. 1-2 and 5A-5B, a probe caddie 200 is illustrated. The probe caddie 200 can allow an operator to quickly and easily switch probes 202, 204, 206 on the PCMM 10. The probe caddie 200 can include a body 210 having recesses 212, 214, 216 formed therein. The body 210 can have an edge 220 having a curved profile configured to couple to a transfer member 24 of the PCMM 10 such as with a fastener, welding, an adhesive, or snap-fit. Desirably, the probe caddie 200 can be coupled to the PCMM 10 at a location near the base 20 such that an operator can have easy access to the probes stored therein and controls on the base 20 and such that the probe caddie 200 does not affect the measuring operation of the PCMM 10. In other embodiments, the probe caddie 200 can be shaped and configured to couple at a different location with of the PCMM 10, such as, for example, the base 20.

Figure 5A:
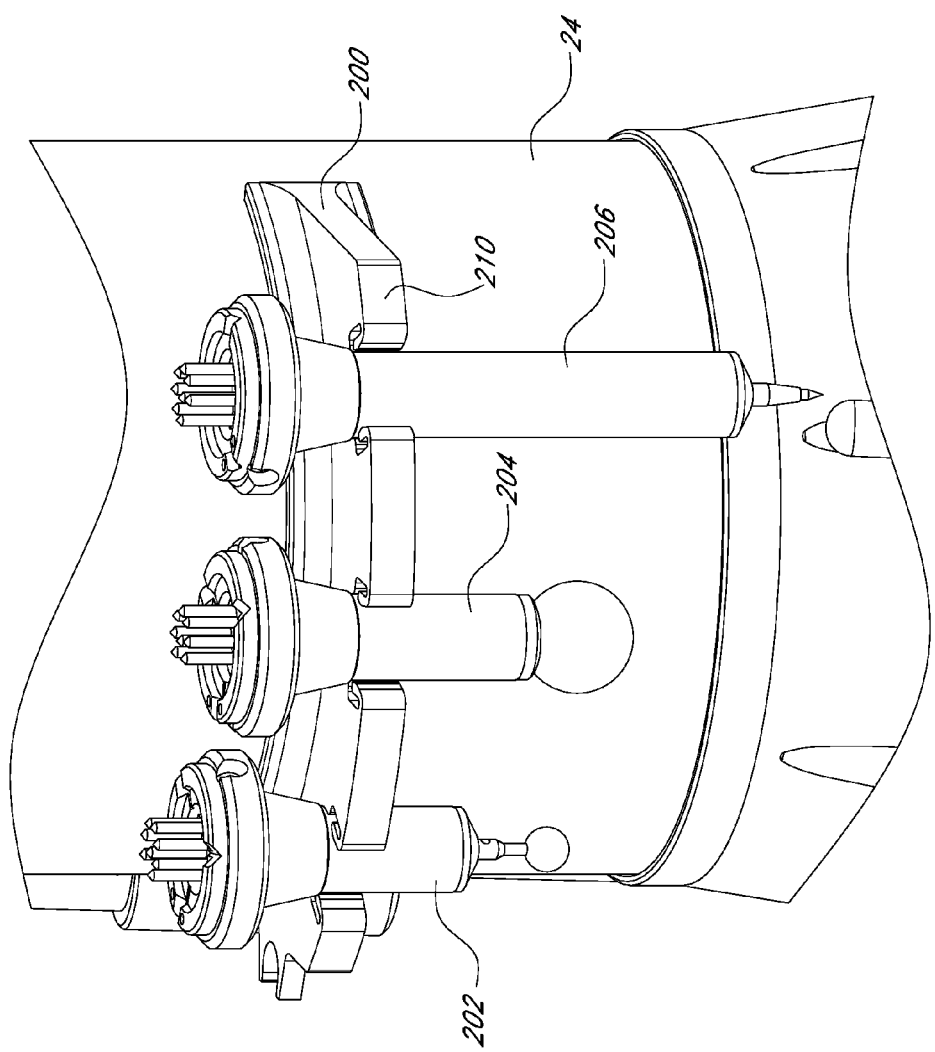
FIG. 5A illustrates a probe caddie for use with a coordinate measuring machine such as that illustrated in FIG. 1.

With reference to FIGS. 5A and 5B, the probe caddie 200 can include a plurality of recesses 212, 214, 216 formed therein and configured to receive a corresponding plurality of probes 202, 204, 206. In the illustrated embodiment, the probe caddie 200 comprises three recesses 212, 214, 216 to receive the corresponding three probes 202, 204, 206. In other embodiments, however, more or fewer than three recesses can be included in the probe caddie 200 to allow the probe caddie to retain a desired number of probes. Each of the recesses 212, 214, 216 can include one or more retention members 222 to selectively retain a probe received therein. In the illustrated embodiment, the retention members 222 comprise tabs formed in the body 210 of the probe caddie 200. In the illustrated embodiment, the tabs can be biased into a retention position such that they tend to retain a probe in recess. The tabs can be sufficiently flexible to allow an operator to withdraw a probe from or replace a probe into the recess as desired. In other embodiments, other retention members or latches can be used to selectively retain a probe. In the illustrated embodiment, each of the recesses 212, 214, 216 has a similar size and configuration. In other embodiments, recesses having different sizes and/or configurations can be provided to retain probes having different sizes or configurations.

With reference to FIGS. 5A and 5B, in various embodiments, the probe caddie 200 can be constructed of various materials. For example, in some embodiments the probe caddie 200 can be constructed of a thermoplastic material. In other embodiments, the probe caddie 200 can be constructed of a metallic material.

With continued reference to FIGS. 5A and 5B, probes 202, 204, 206 can be provided for use with the PCMM 10 that, in conjunction with the probe caddie 200 allow for ease and speed in switching probes on the PCMM 10. For example, the probes 202, 204, 206 can be configured to allow rapidly repeatable kinematic mounting. In some embodiments, the probes can include push pin connectors 230 to electrically couple each probe 202, 204, 206 to the PCMM 10 when in use. The probes 202, 204, 206 can also include alignment features, such as grooves 232 formed therein to allow repeatable mounting at a desired alignment with the PCMM 10.

Although this application has been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while the number of variations of the inventions have been shown and described in detail, other modifications, which are within the scope of this inventions, will be readily apparent to those of skill in the art based upon this disclosure. It is also contemplated that various combinations or subcombinations of the specific features and aspects of the embodiments may be made and still fall within the scope of the inventions. Accordingly, it should be understood that various features and aspects of the disclosed embodiments can be combined with, or substituted for, one another in order to perform varying modes of the disclosed invention. Thus, it is intended that the scope of the present inventions herein disclosed should not be limited by the particular disclosed embodiments described above, but should be determined only by a fair reading of the claims.

What is claimed is:

1. A coordinate measuring machine comprising:
a first transfer member;
a second transfer member rotatably coupled to the first transfer member;
a first portion connected to the transfer members and adapted to receive a probe in a measuring position; and
a probe caddie disposed on at least one of the transfer members of the coordinate measuring machine and adapted to receive at least one probe.

2. The coordinate measuring machine of claim 1, wherein the first portion is at an end of one of the first transfer member and the second transfer member.

3. The coordinate measuring machine of claim 1, wherein the probe caddie is adapted to receive at least three probes.

4. The coordinate measuring machine of claim 1, wherein the probe caddie comprises at least one retention member biased to retain at least one probe.

5. The coordinate measuring machine of claim 1, further comprising a rotatable grip assembly disposed on the first transfer member.

6. The coordinate measuring machine of claim 5, wherein the rotatable grip assembly comprises a first retention ring positioned about the transfer member on which the rotatable grip assembly is disposed.

7. The coordinate measuring machine of claim 6, wherein the rotatable grip assembly further comprises a second retention ring positioned about the transfer member on which the rotatable grip assembly is disposed.

8. The coordinate measuring machine of claim 5, wherein the grip assembly comprises a plurality of dimples formed therein.

9. The coordinate measuring machine of claim 5, wherein the grip assembly comprises a rotatable sleeve disposed about the first transfer member and a grip portion disposed about the rotatable sleeve.

10. A coordinate measuring machine comprising:
a first transfer member;
a second transfer member rotatably coupled to the first transfer member;
a first portion connected to the transfer members and the joint assembly, the first portion being adapted to receive a probe in a measuring position such that the probe is rotatable relative to the first transfer member; and
a rotatable grip assembly disposed on the first transfer member.

11. The coordinate measuring machine of claim 10, wherein the rotatable grip assembly comprises a first retention ring positioned about the transfer member on which the rotatable grip assembly is disposed.

12. The coordinate measuring machine of claim 11, wherein the rotatable grip assembly further comprises a second retention ring positioned about the transfer member on which the rotatable grip assembly is disposed.

13. The coordinate measuring machine of claim 10, wherein the grip assembly comprises a plurality of dimples formed therein.

14. The coordinate measuring machine of claim 10, wherein the grip assembly comprises a rotatable sleeve disposed about the first transfer member and a grip portion disposed about the rotatable sleeve.

15. A coordinate measuring machine comprising:
a first transfer member;
a second transfer member rotatably coupled to the first transfer member;
a portion mounted to the first transfer member, the portion being adapted to receive a probe in a measuring position; and
a rotatable grip assembly disposed on the second transfer member.

16. The coordinate measuring machine of claim 15, wherein the rotatable grip assembly comprises a first retention ring positioned about the transfer member on which the rotatable grip assembly is disposed.

17. The coordinate measuring machine of claim 16, wherein the rotatable grip assembly further comprises a second retention ring positioned about the transfer member on which the rotatable grip assembly is disposed.

18. The coordinate measuring machine of claim 15, wherein the grip assembly comprises a plurality of dimples formed therein.

19. The coordinate measuring machine of claim 15, wherein the grip assembly comprises a rotatable sleeve disposed about the first transfer member and a grip portion disposed about the rotatable sleeve.

* * * * *